Feb. 5, 1924.
H. H. CLARKE
TIRE ALARM
Filed Jan. 19, 1923
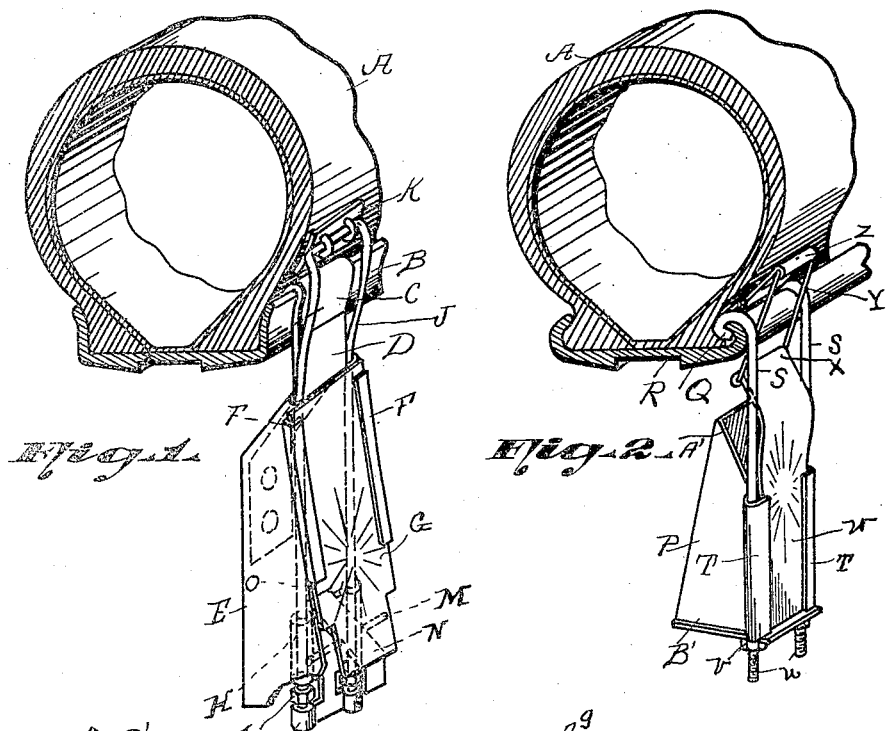
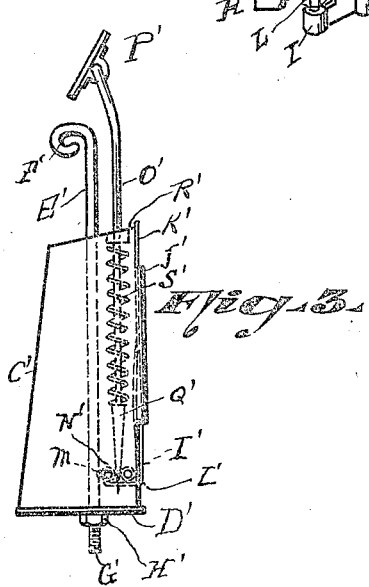
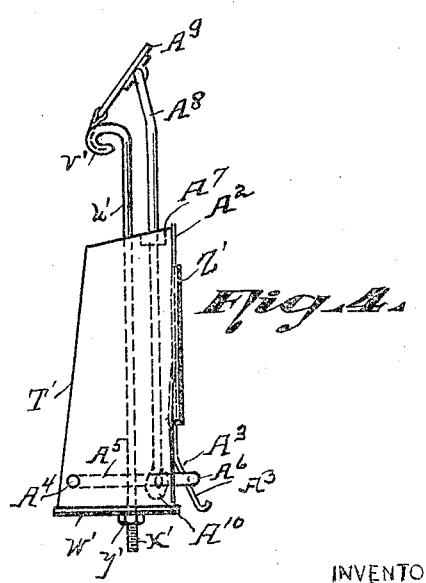
INVENTOR
Hal H. Clarke

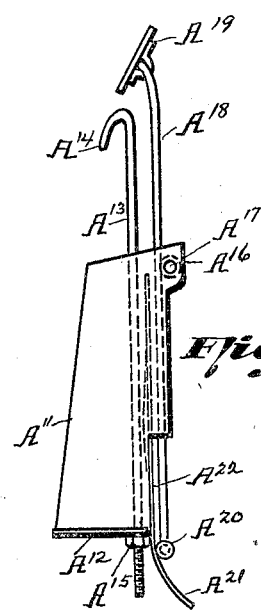
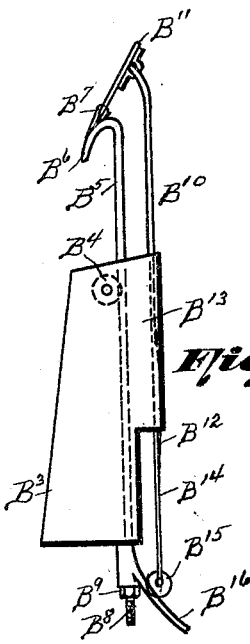
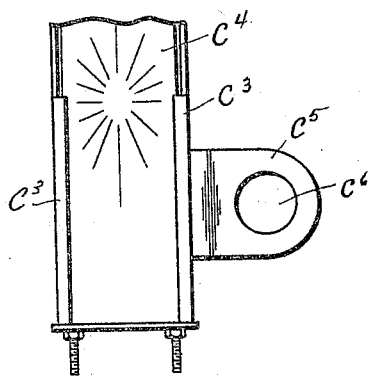
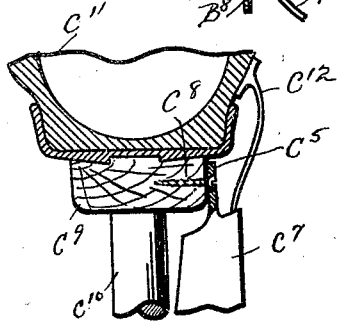
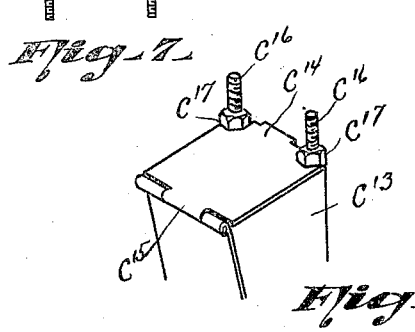

Feb. 5, 1924.    H. H. CLARKE    1,482,737
TIRE ALARM
Filed Jan. 19, 1923    3 Sheets-Sheet 3
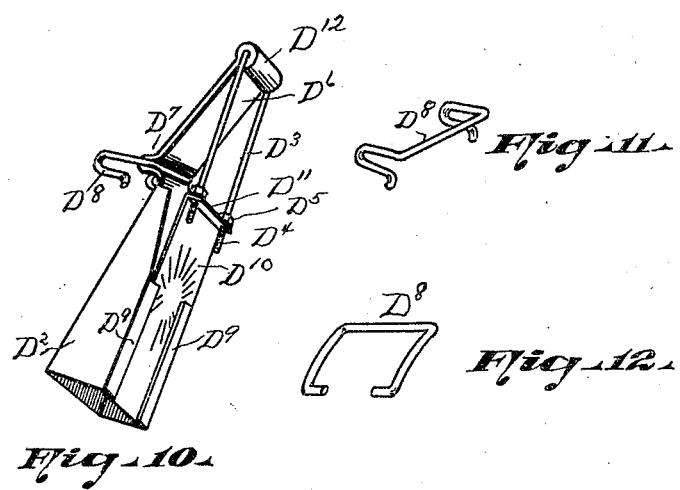
Fig. 10.
Fig. 11.
Fig. 12.
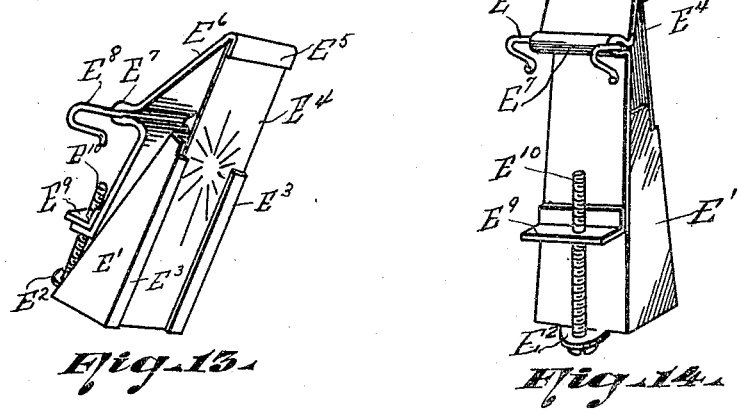
Fig. 13.
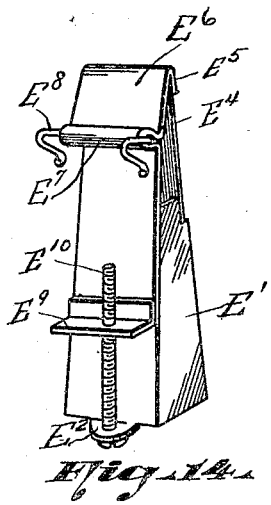
Fig. 14.
INVENTOR.
Hal H. Clarke Patented Feb. 5, 1924.

1,482,737

UNITED STATES PATENT OFFICE.

HAL H. CLARKE, OF CHEROKEE, OKLAHOMA.

TIRE ALARM.

Application filed January 19, 1923. Serial No. 613,654.

*To all whom it may concern:*

Be it known that I, HAL H. CLARKE, a citizen of the United States, residing at Cherokee, in the county of Alfalfa and State of Oklahoma, have invented a certain new and useful Invention in Tire Alarms, of which the following is a specification, reference being had to the accompanying drawings.

This invention relates to means for using the inflating process of an automobile tire, for producing a sound to notify of the fact of deflation.

An object of the invention is to invoke the aid of progressive deflation for the purpose of operation of means adapted to produce mechanical distortion, and consequently atmospheric impact, resulting in a sharp sound attractive as a signal.

Other objects of the invention, will, of course appear from a further, and more complete reading of the following specification, drawings, and claims.

On the sheets of drawings, accompanying and forming a part of the specification, Figure 1 is a perspective view, fragmenting a tire, and showing a construction efficient in the invention, Figure 2, shows a similar view both of tire and a construction separate and distinct from that illustrated in said Figure 1.

Figure 3 is an elevational view from the side and shows the cooperative spring actuated means for producing sound.

Figure 4, a similar view, shows a lever construction for the same purpose.

Figure 5, a side elevation view shows a roller bearing construction operating on a spring actuated member, Figure 6, a side elevation view shows a spring actuated member carrying a roller for the same purpose.

Figure 7 shows in detail means for attaching the devices to a lug on the wheel,

Figure 8 is a sectional view of felly, tire, and Figure 7 applied,

Figure 9 shows a detail in perspective of a hinged bottom and adjustments for the sounding boxes of the invention, Figure 10 is a perspective of a device involving direct action, Figures 11 and 12 are means of fastening, and Figures 13 and 14, are two views of an additional form of invention and where the action is direct on a vibrating plate.

In these several views, similar characters of reference indicate similar parts.

We will now consider the devices as numerically arranged on the sheets of drawings.

The tire will be designated by A, and the rim by B. Overhanging the rim is a cleat C, carrying an apron D, forming a part of a sounding box E. The apron D may be associated with the sounding box E in any suitable manner, as for instance, as shown in dotted lines of said Figure 1. Suitably associated with the sounding box E are guides F adapted to receive and retain a sounder G, the operation whereof will soon be explained.

Mounted in suitable bearings H, indicated in dotted lines and bearings I is a tined member, preferably, and indicated generally by J, in the bight whereof is mounted a contact plate K for bearing against the outer wall of the tire A. The pressure of this plate will be regulated by the turn-nuts L more clearly seen at the broken away portion of the figure. Upon a fulcrum, M suitably journaled, is a lever N which is associated with a strut, O, carrying the bearings H and when deflation sets in, in the tire, and the pressure is placed against the plate K, and transmitted on through to the strut O, the lever turns on its fulcrum, bearing its free end outward, and against the underside of the sounding board or snapper plate G, and as may be seen by the indicative radiating lines, flexation in the metal of the board or plate causes an impact against the atmosphere which creates a sound or signal. The sounding box will absorb the result of impact and intensify the sound. As to the character of the sound desired, the parts may be regulated through the turn nuts aforementioned.

Turning our attention to Figure 2, the sounding box is held in place by hooks Q holding onto the rim R, and which are associated with legs S, which are held in bearings T, after which they are screw-threaded at U to receive adjusting nuts V for the purpose of adjusting the device especially to adjust the tire plate against the tire and put tension on the spring.

Located also in said guides or bearings T, is a sounding board or snapper board W, the upper free end X whereof is associated with a link Y secured to a plate Z that is adapted to lie against the tire A and when the same deflates, and pressure is downward (according to the position of the drawing) the movement will be transmitted to the link S and the board W, and as will be seen the board will flex, somewhat according to the radially shown lines, and cause the board to snap, and the noise that results from same will be intensified by the sounding box P, which is open at A' and lidded at B'. As before indicated, the function of snapping the board may be the result of adjustments by the turn nuts V.

By reference to Figure 3, the sounding box C' provided with a bottom D' supports an adjustably mounted pair of standards E' which terminate in hooks F' for gripping onto a rim of a wheel. The lower end of these standards E' are screw-threaded at G' to receive adjusting nuts H'. Fixed within the box C' near the lower part thereof is a roller I'. To the one side of the box C' are guides or bearings J' to receive and hold a sounding or snapping board K', the lower part whereof is inturned at L' to reach to a bearing M' to receive a roller N'.

A member O' carries a tire plate P', and a wedged shaped terminal Q', between which and a bearing R' is a convoluted spring S'. When the hooks F' are in place, and the plate P' is against the outside of the tire and the latter deflates the wedge will force the rollers apart, draw upon the lower inturned part L' of the sounding plate or board, and cause the same character of impact for the same purpose as previously explained, and the adjustment through the nuts H' will give the same results as previously explained.

In Figure 4, the sounding box T' is supported when in place by its association with standards U' having the usual hooks V' for association with the wheel rim, and these standards have their lower ends after passing through the bottom W' screw-threaded at X' and provided with nuts Y' for adjusting the structure at will.

To the one side of this box T' are bearings or guides Z' which holds and permits the movement of a sounding or snapping board $A^2$ which terminates in a free extended member of a spring nature, and which is designated $A^3$. To the interior of the box T' is journaled at $A^4$ a lever $A^5$ having at the fore or free end thereof a roller $A^6$ to ride the free spring end $A^3$ of the sounding or snapping board $A^2$.

Within the box, T' journalled in bearing $A^7$ is a stem $A^8$ suitably formed and carrying a tire-plate $A^9$, and the lower end thereof is journalled at $A^{10}$ to the said lever $A^5$. When the parts are in place, and the tire deflates, the downward pressure will result in a lateral pull on the spring blade $A^3$ and cause the sounding board to snap or pop.

Referring to Figure 5, the sounding box $A^{11}$ provided with the usual bottom $A^{12}$ is carried by the standards $A^{13}$, having the rim hooks $A^{14}$, and the lower ends of these are screw-threaded to receive nuts $A^{15}$ for adjusting the device in a manner as aforesaid.

From an offset $A^{16}$, in the sounding box $A^{11}$ is journaled a roller $A^{17}$ serving as a partial guide to a stem $A^{18}$ bearing the tire plate $A^{19}$ which stem at its lower end is provided with a roller $A^{20}$ that is adapted to ride a spring tail $A^{21}$, in this way the stem is borne in proper place for service. When the structure thus set forth is in place for action, and the collapsed tire bears on plate $A^{19}$, the pressure being downward will cause roller $A^{20}$ to ride the spring tail $A^{21}$ to flex the sounding board $A^{22}$ and cause an amplified sounding from it and the associated sounding box.

In Figure 6 the sounding box may be known as $B^3$ in which is journalled a roller $B^4$. This box is supported by standards $B^5$ with the usual rim hooks $B^6$, having a bearing $B^7$, and the lower end of which standards are screw-threaded at $B^8$ to receive the usual adjustment nuts $B^9$ for the general purpose which has already been mentioned.

A leg $B^{10}$ is provided at its upper free end with a tire plate $B^{11}$ which is linked to the bearing $B^7$ herein before mentioned. This leg is associated with a sounding board $B^{12}$ which is guided and housed in an offset $B^{13}$ of the sounding box, and the lower end of this sounding board is associated with a spring acting member $B^{14}$ provided with a roller $B^{15}$ that rides a cam $B^{16}$ carried on the part $B^8$. When the tire collapse takes place, the pressure is in downward direction, and as the roller passes along the face of the cam the sounding board will flex and snap and the snapping function will be transmitted and intensified by and through the sounding box.

Referring now to Figures 7 and 8 we have lug attaching designs for sounders so that the same can be applied to the rim of the wheel at will.

The sounding box, together with the sounding board, both of which are indicated by $C^3$ and $C^4$ may be of any suitable arrangement, either of the type already described, or any other type, and to such structure may be associated a lug $C^5$ having an opening $C^6$ for receiving the lug on the rim of the wheel, after which the nut may be applied.

This lug $C^5$ may also carry a device, indicated, in a general way by $C^7$, and may be screwed onto the rim at $C^8$, the rim being indicated by $C^9$ and the spoke by $C^{10}$, while the fragment of tire may be designated $C^{11}$ and the tire plate element by $C^{12}$.

In Figure 9 only a detail of the sounding box $C^{13}$ is shown, and the same is provided with a bottom $C^{14}$, indicated at $C^{15}$ as hinged to the sounding box, the usual adjustment means being indicated by the screw-threaded posts $C^{16}$ and the adjusting nuts $C^{17}$.

Considering now the views of Figures 10, 11 and 12 there is a sounding box $D^2$ supported by a link $D^3$, the ends of which are screw-threaded at $D^4$, and provided with the usual adjusting nuts $D^5$. To the bight of this link $D^3$, is affixed movably a strip of suitable material $D^6$, perhaps preferably flexible, in a secondary bight $D^7$ whereof is a clamp for a tire rim, and the remaining free end of this member $D^6$ is secured to the body of the sounding box $D^2$ in any suitable manner.

Within the cleating confines $D^9$ of the sounding box $D^2$ is a sounding board $D^{10}$ that is provided with a lip $D^{11}$ that takes over the screw-threaded rods $D^4$ and its position is adjusted by the aforenamed adjustment nuts $D^5$. When tire pressure, due to deflation is transmitted to the bight $D^{12}$ the pressure being toward the sounding board will flex same and cause disalignment and a snapping sound which will be intensified by the sounding box, and an alarm will be given.

Finally Figures 13 and 14 represent two views of the same type of alarm, having the usual sounding box $E'$ with a rear lug $E^2$. The front of the box is provided with the sounding board guides $E^3$ to receive and hold the sounding board $E^4$, overtaken by a lip $E^5$ of a strip of material $E^6$, which may be of a flexible nature at will, and in a bight $E^7$ of which is contained a rim clamp $E^8$, and this strip continues in formation until it reaches to and under a plate $E^9$ through which and the strip is passed a screw-threaded bolt $E^{10}$, which also passes through the lug $E^2$.

By the use of the adjustment here, the pressure to the sounding board through the strip $E^6$ may be graduated, and when the tire deflated rests against part $E^6$ the pressure will be supplied to the sounding board $E^4$ and cause the alarm.

It will be readily seen, by observing the various constructions, that a novel means, well simplified, has been created, in principle, for building a tire alarm; which alarm depends upon tire deflation for operation, and that there is shown a variety of fashions in which the principle of invention may be applied.

Having thus described this invention, I claim:—

1. A tire alarm including a sounding board, a sounding box, associated therewith, means to affix them in place, a tire plate, means operating from the tire plate, at the instance of tire deflation to affect the sounding board and create a vibration.

2. A tire alarm, including a sounding board, a sounding box, associated therewith, means to affix them in place, a tire plate, means operating from the tire plate, at the instance of tire deflation to affect the sounding board and create a vibration, and adjusting means to govern the juxtaposition of the tire and plate.

3. A tire alarm, including a vibratory sounding plate, a sounding box associated therewith, means to affix the same to the tire rim, a secondary element adapted to be placed against a tire, means to adjust the same to right position, means carried in conjunction with the secondary means for actuating the sounding plate to cause distortion thereof and create a sound to be transmitted to the sounding box.

4. A tire alarm including a sounding board, a sounding box associated therewith, means to affix them in operative position, a tire plate, means of variable dimension operating from the tire plate, at the instance of tire deflation to affect the sounding board and create a vibration, and means to relatively adjust the plate and board for tires of different sizes.

5. A tire alarm including a sounding board, a sounding box associated therewith, means to affix them in both operative and adjustable positions, each, a tire plate, means operating from the tire plate, at the instance of tire disalingment, especially caused by tire deflation to affect the sounding board and create a vibration, and means to adjust the wall of the sounding board.

Signed at Cherokee, in the county of Alfalfa and State of Oklahoma, October, in the year of our Lord, nineteen hundred and twenty-two.

HAL H. CLARKE.